Jan. 24, 1967   M. L. SELKER ETAL   3,300,257
LUBRICATED RUBBER BEARING
Filed Nov. 7, 1962

INVENTORS
MILTON L. SELKER
PASCHAL P. ZAPPONI
BY
Eber J. Hyde
ATTORNEY

United States Patent Office 3,300,257
Patented Jan. 24, 1967

3,300,257
LUBRICATED RUBBER BEARING
Milton L. Selker, Shaker Heights, and Paschal P. Zapponi, Cleveland, Ohio, assignors to Clevite Harris Products, Inc., a corporation of Ohio
Filed Nov. 7, 1962, Ser. No. 235,974
3 Claims. (Cl. 308—36.1)

This invention pertains to a lubricated rubber bearing wherein the lubricant is permanently retained within the bearing. The term "rubber" is to be understood to include natural rubber and synthetic rubber-like elastomers. The term "permanent" is to be understood to mean that the bearing is not subject to periodic lubrication; i.e., no lubricant is added for the life of the bearing, and if the bearing eventually fails, it is replaced.

This application is related to United States application Serial Number 103,690, filed in the name of Robert T. Drake, for a Permanently Lubricated Rubber Bearing, and owned by the assignee of the present invention, now Patent No. 3,113,769.

The present invention is a refinement and extension of the invention claimed in the aforesaid patent application.

In the past rubber bearings and bushings have been made consisting of two concentric, spaced-apart metal sleeves with rubber between the two sleeves in such a manner that relative rotary motion between the sleeves caused shear in the rubber. The rubber was bonded to both of the sleeves or adhered to them by either a chemical bond or a frictional bond, or by a combination of the two bonds. Units having a high frictional bond or adherence often used a temporary lubricating material during assembly when the rubber sleeve was "shot" into the metal sleeves. Almost all of this temporary lubricating material was squeezed out during assembly and the remainder of the lubricant was absorbed by the rubber within a short period of time, resulting in a device which had the desired high frictional forces or adherence between the rubber and the sleeves when it was put to its intended use.

Bearings and bushings made with these techniques have been successfully used extensively in automotive construction, especially in front suspension control arm pivot joints, shock absorber pivotal joints, steering linkage bushings, rear suspension linkage bushings, and the like.

The aforedescribed rubber bearings have inherent high torsional spring-rate characteristics, evidenced by the fact that if either of the two sleeves was rotated torsionally with respect to the other sleeve, forces would build up in the rubber which would try to return the sleeves to their original positions.

The inherent torsional spring-rate characteristic has created problems and limitations in designing automotive chassis linkages for particular ride qualities, and accordingly there is a need for a low-cost rubber bearing which retains all of the desirable features of the previous rubber bearing, but which has low torque or spring rate characteristics.

While the automobile chassis linkage is the first commercial application of the lubricated rubber bearing of this invention, the bearing has such excellent qualities that many other fields are open to its use, and whereas the description of the invention is directed to automotive applications it is to be understood that this is by way of explanation and is not to be construed as limiting the use of this bearing to the automotive field.

The previously mentioned device provides a permanently lubricated, sealed, rubber-to-metal bearing interface, and is highly successful for for oscillating bushings wherein the load in pounds per square inch does not exceed a moderate value, and is successful where the bushing is oscillated through an appreciable angle and is not subject to prolonged periods of inactivity. The previously-mentioned device also is operable in many instances where rotation of the inner member in respect to the outer member occurs.

Experience with the permanently lubricated, sealed rubber-to-metal bushing has shown that high loads may displace the lubricant resulting in an essentially dry rubber-to-metal condition at some location in the bushing. Also, long periods of inactivity in a loaded condition may result in migration of the sealed-in lubricant and a dry location, and when the bushing is subsequently oscillated damage occurs at the dry spot. Another extremely severe condition results from long periods of very small relative oscillation between the rubber and the metal members. The small oscillations prevent the lubricant-filled pockets in the rubber from sweeping across the metal surface thereby to replenish the lubricant on the surface of the metal member, and the load bearing areas of rubber-to-metal contact may gradually lose their lubricant film to the pockets, with consequent dry operating conditions and damage.

It is an object of this invention to provide a permanently lubricated rubber bushing or bearing having substantially no torsional spring rate, having a very low coefficient of friction, and that will withstand high loads, and long periods of oscillation through small angles.

It is an object of the present invention to provide a sleeve-type rubber metal bearing or bushing which has no inherent torsional spring rate, yet which retains all of the desirable features of rubber bearings in regard to axial and radial deflection, shock isolation, noise reduction, etc., and which will withstand high loads and long periods of inactivity, without losing the lubricant film between the rubber and the metal.

A further object of the invention is the provision of a rubber sleeve bearing permanently containing two supplies of lubricating material sealed into the unit, one in the fine pores in the bearing and the other in pockets, whereby for the life of the unit no additional lubricant need be, or can be, added.

For a better understanding of the present invention, together with other and further objects thereof, reference is had to the following description taken in connection with the accompanying drawings, and is scope will be pointed out in the appended claims.

An aspect of the invention lies in the provision of a permanently lubricated bearing structure wherein a relatively hard member is formed of polymer coated fibers which define pores, and a relatively soft elastomeric supporting member is connected directly against the back face of the relatively hard member. The relatively hard member has a lubricant in the pores, and its front face engages a companion bearing surface of a member which is harder than the relatively hard member for relative motion in respect thereto.

In another aspect of the invention, in addition to the above set forth structure, the front face of the relatively hard polymer coated fibrous member defines a plurality of pockets forming reservoirs for lubricant.

Figure 1:
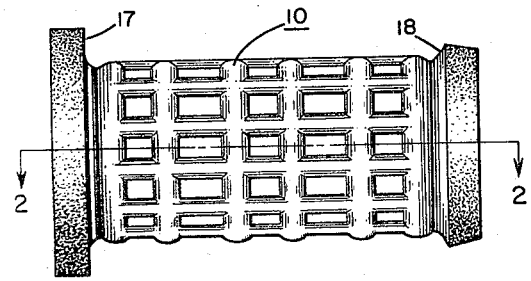
FIGURE 1 shows a side view of a typical rubber-metal bushing showing the lubricant receiving reservoirs.
Figure 2:
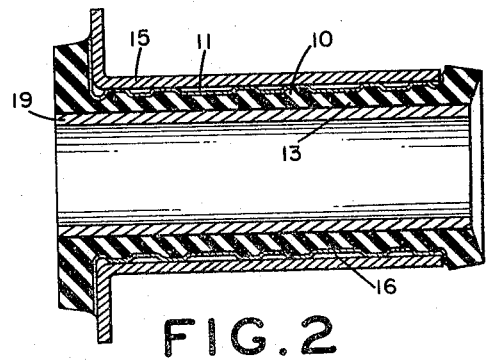
FIGURE 2 is a sectional view taken along line 2—2 of FIGURE 1, showing the bushing within a metal tube.
Figure 7:
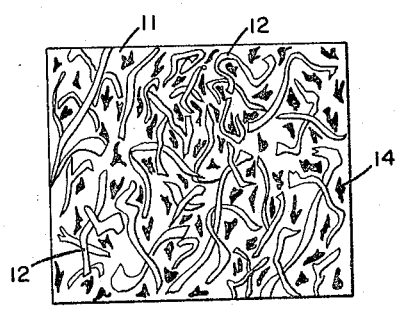
FIGURE 7 is a drawing of a greatly enlarged photograph showing the polymer coated fibers, the pores between them and the incorporated lubricant.

With reference to FIGURES 1 and 2 of the drawing there is shown a tubular bushing 10 comprised of a relatively hard member 11 formed of polymer coated fibers and defining pores between the fibers. FIGURE 7 shows by a greatly enlarged view the fibers 12 randomly disposed and each substantially completely coated with a polymer. A relatively soft elastomeric supporting member 13 such as rubber is connected directly against the back face of the relatively hard member 11 to resiliently support the hard member. As is shown in FIGURE 7 the relatively hard member 11 incorporates a lubricant 14 in the pores between the polymer coated fibers. The front face of the relatively hard member 11 may define a plurality of reservoirs or pockets 16 for receiving and retaining lubricant such as silicone grease, and the end flanges 17 and 18 of the bushing 10 may provides sealing means to seal the lubricant between the bushing 10 and the tubular member 15 to establish a permanently lubricated device.

The permanently lubricated, sealed, rubber-to-metal bearing of the Drake application has lubricant in pockets or reservoirs located between the outer metal member and the rubber bushing, and it operates well under load conditions when the static load does not exceed about 400 pounds per square inch. Above this loading the relatively soft rubber load supporting ribs between the reservoirs are displaced into the reservoirs and the lubricant therein of necessity must flow out to a more lightly loaded area of the bushing. In operation, when the parts of the bushing are almost continuously undergoing oscillating relative motion this migration of the excess lubricant which normally is in the reservoirs does not cause difficulty. However, if a heavily loaded bushing is at rest over an extended period of time, as would be the case where an automobile is not driven for several weeks, a dry condition might be established between the steel outer tubular member and the rubber bushing. Upon subsequent relative motion damage would be inflicted on the rubber member.

To eliminate this possibility of damage the present invention relates to a rubber-metal bearing wherein the surface of the rubber member is relatively hard compared to the rubber backing member, and it is porous and the pores contain a lubricant. Consequently, the bearing interface is made up of a large number of closely spaced, lubricant filled pores, and a supply of lubricant is always present. The lubricant in the pores of the relatively hard layer does not migrate with the application of load, even over a long period of time. Also, relative motion between the companion bearing surfaces, however little, is sufficient to move a small amount of lubricant across the metal surface, thereby to assure a continuous supply of grease or the like to the relatively moving surfaces.

In a unit where the surface has large reservoirs 16, the relatively hard surface, in addition to being porous and containing lubricant, prevents the load from distorting the rubber backing member to the point that the reservoirs 16 essentially disappear. Thus the hard member 11 restricts the migration of the large amounts of lubricant away from the heavily loaded areas, enabling the bushing to sustain much greater loads than it could without the relatively hard member.

For automotive use it is preferable that the outer tube 15 be formed of metal and have a smooth inner face, though of course it is not essential for many uses that metal be used.

The relatively soft elastomeric supporting member 13 preferably is backed by an inner member such as the tubular member 19 which facilitates assembly, and member 13 may be formed of natural or artificial rubber. The relatively hard member 11 preferably is formed of random cellulose fibers, such as paper, in which each individual fiber is substantially completely coated by a polymer such as latex or the like. By so coating the fibers the essential porous character of the paper is retained, and a dry or liquid lubricant is carried in the pores. The dry lubricant may be graphite or nylon powder or the like, or a liquid or semiliquid lubricant such as oil or grease may occupy the pores. Since the individual fibers of the paper are polymer coated there is no tendency for the harder layer 11 to swell over a period of time, thus to cause an undesired dimensional change in the bearing.

The paper which forms the relatively hard layer 11 preferably is compressed at high pressures on the order of 1500 pounds per square inch during manufacture, further to insure dimensional stability over a long period of time even when in the presence of liquid lubricants.

Stability of dimensions is important. The compressed latex impregnated paper is quite hard, and it is this hard facing connected to the softer rubber bushing which restricts the deformation of the rubber, enabling the device to hold a much greater load, reducing the squeezing out of the lubricant from the reservoir pockets. The configuration on the bearing face of the relatively hard material tends to restrict the large masses of lubricant from migrating and cooperates with the small masses of lubricant in the pores to provide good local distribution of lubricant under a wide variety of operating conditions, and even after a long period of idleness upon oscillation commencing lubrication is almost immediate and the material 11, being much harder than rubber, is less apt to tear and be damaged by a short interval of essentially dry operation.

The surface 11 is relatively hard compared to the rubber backing member 13 and shooting the unit into the tubular outer member 15 with an interference fit is apt to damage it. Since the relatively hard surface 11 is dimensionally stable the bearing structure could be assembled with or without an interference fit.

An advantageous method of assembling the bearing structure is to place the latex impregnated compressed paper in a mold, and to partially cure the rubber 13 while it is in contact therewith. This will establish good adhesion between the rubber backing 13 and the latex impregnated paper 11. Thereafter the partially cured sub-assembly is inserted in the outer metal tube 15 and there it is finish-cured so that the paper-faced rubber takes a permanent set. This opens up the tolerances on the outer tube and prevents damage which otherwise might be caused by trying to force the relatively hard member 11 into a metal tube whose tolerances would have to be closely held.

Figure 3:
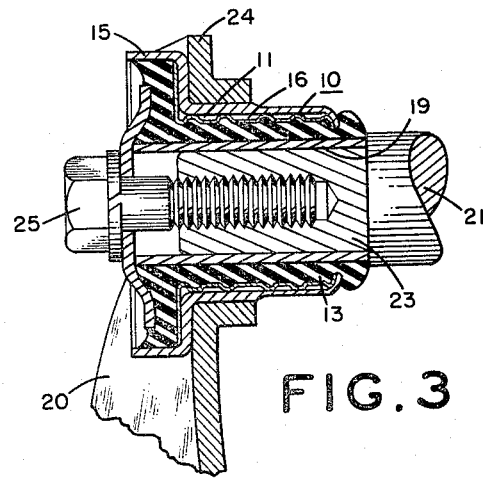
FIGURE 3 shows by a cross-sectional view a slightly modified bushing in an assembly.

The device may be sold in the form shown in FIGURE 1 without the outside metal tube 15, and the purchaser would then assemble the device into a joint such as the one shown in FIGURE 3. Or the device, prior to sale, may be assembled into an outer metal sleeve 15, as shown in FIGURE 2.

FIGURE 3 illustrates one typical installation of a pivotal joint embodying the invention. In this installation the joint is between an upper control arm 20 and a control arm shaft 21 in a typical automotive suspension system.

The bearing unit 10 is tubular and fits around a reduced end portion 23 of the control arm shaft, and by a force fit is held in close engagement with a shoulder 24 of the upper control arm 20. The reduced end portion 23 of the control arm shaft 21 is bored and threaded, and a bolt 25 extends into the bearing unit 10 into threaded engagement with the control arm shaft 21, thereby locking the bearing unit in place.

Preferably the inner sleeve 19 is bonded or otherwise affixed to the rubber inner member 13 so that all relative motion between the inner 19 and outer 15 metal sleeves takes place between the lubricated outer surface of the relatively hard member 11 and the inner face of the outer tube 15. However, it definitely is within the scope of this invention to bond the rubber, frictionally or otherwise, to the outer metal member and to affix the relatively hard member to the inner surface of the relatively softer rubber-like member. Relative motion would then take place between the inner metal sleeve and the lubricated surface of the relatively hard member.

Figure 4:
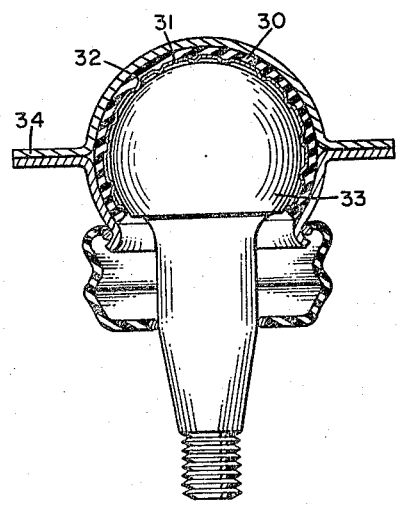
FIGURE 4 shows by a sectional view the invention applied to a ball joint.

In addition to the tubular joint shown in FIGURE 3, the invention is applicable to ball joints as shown in FIGURE 4. In this application the rubber member 30 has secured to its inside surface a relatively harder layer 31 formed with lubricant receiving pockets 32, comparable to the layer 11 of FIGURE 2. The relatively harder layer 31 is comparable in all respects to the layer 11 in that it is formed of random fibrous cellulose material coated with latex and containing a lubricant. Relative motion takes place between the ball stud 33 and the lubricated layer 31.

A socket member 34, well known in the art, is around the outside of the rubber member 30.

Figure 5:
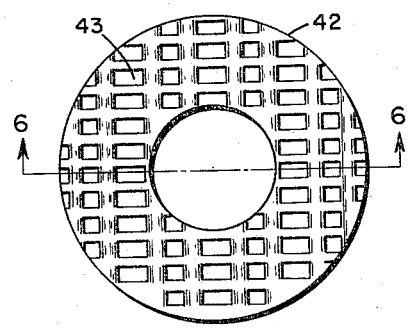
FIGURE 5 shows by a plan view the invention applied to a thrust washer or a clutch face.
Figure 6:
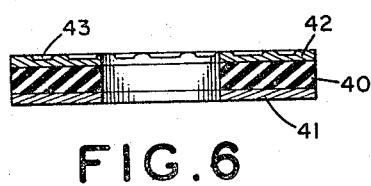
FIGURE 6 is a sectional view taken along line 6—6 of FIGURE 5.

Additionally the invention may be applied to clutch facings, thrust washers or the like, which are flat, as shown in FIGURES 5 and 6. In this structure the rubber-like inner member 40 is backed by a hard layer such as steel 41 and the opposite face thereof has secured to it a layer 42 which is harder than the rubber-like material 42. Pockets 43 preferably are formed in the outside face of the relatively harder layer 42 to receive and retain lubricant, and the material of the layer 42 is in all respects equivalent to the previously described layer 11.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A bearing structure comprising a relatively hard tubular member formed of polymer coated randomly distributed fibers defining pores between the said polymer coated fibers, a relatively soft tubular elastomeric supporting member connected directly against the inside back face of said relatively hard member, the relatively hard member incorporating a lubricant in the pores between the polymer coated fibers, the front face of said relatively hard member engaging a companion bearing surface of a member which is harder than said relatively hard member for relative motion in respect thereto, an inner tubular member bonded to the inside back face of said elastomeric member, said elastomeric member including at its ends means for sealing said lubricant between said relatively hard member and the member having the companion bearing surface.

2. A bearing structure as set forth in claim 1, further characterized by the front face of said polymer coated fibrous member defining a plurality of pockets forming reservoirs with lubricant therein.

3. A bearing structure for rotary motion comprising, an inner member; an outer member concentrically around said inner member and spaced therefrom; resilient bearing means compressed between said concentric inner and outer members for transmitting load from one of said members to the other; said resilient bearing means comprising a relatively hard member formed of polymer coated randomly distributed fibers defining pores between the said polymer coated fibers and having a front face and a back face and incorporating a lubricant in the pores between the polymer coated fibers, and a relatively soft elastomeric supporting member connected directly against the back face of said relatively hard member, the front face of said relatively hard member engaging a companion bearing surface of one of said concentric members for relative motion in respect thereto; the other of said concentric members being bonded to said elastomeric member; said elastomeric member including means for sealing said lubricant between said relatively hard member and the member having the companion bearing surface.

References Cited by the Examiner
UNITED STATES PATENTS

| | | | |
|---|---|---|---|
| 2,400,091 | 5/1946 | Alfthan | 308—238 |
| 2,537,629 | 1/1951 | Brown | 308—240 |
| 2,573,138 | 10/1951 | Gerner | 308—36.1 |
| 2,672,443 | 3/1954 | Screnock | 308—238 |
| 2,757,109 | 7/1956 | Martello | 308—238 |
| 2,804,886 | 9/1957 | White | 308—238 |
| 2,827,303 | 3/1958 | Herbenar | 308—238 |
| 2,906,552 | 9/1959 | White | 308—238 |
| 2,946,094 | 7/1960 | Kawasaki | 308—238 |
| 3,013,967 | 12/1961 | Rulon-Miller et al. | 308—238 |
| 3,056,709 | 10/1962 | Rising et al. | 308—238 |
| 3,108,018 | 10/1963 | Lewis | 308—238 |
| 3,130,991 | 4/1964 | Piragino. | |
| 3,133,769 | 5/1964 | Drake | 308—26 X |
| 3,151,015 | 9/1964 | Griffith | 308—238 |

EDGAR W. GEOGHEGAN, *Primary Examiner.*

ROBERT C. RIORDON, DAVID J. WILLIAMOWSKY,
*Examiners.*

D. C. CHAMPION, R. F. HESS, *Assistant Examiners,*